G. C. SNYDER.
FASTENING DEVICE.
APPLICATION FILED FEB. 10, 1914.
1,205,046.
Patented Nov. 14, 1916.
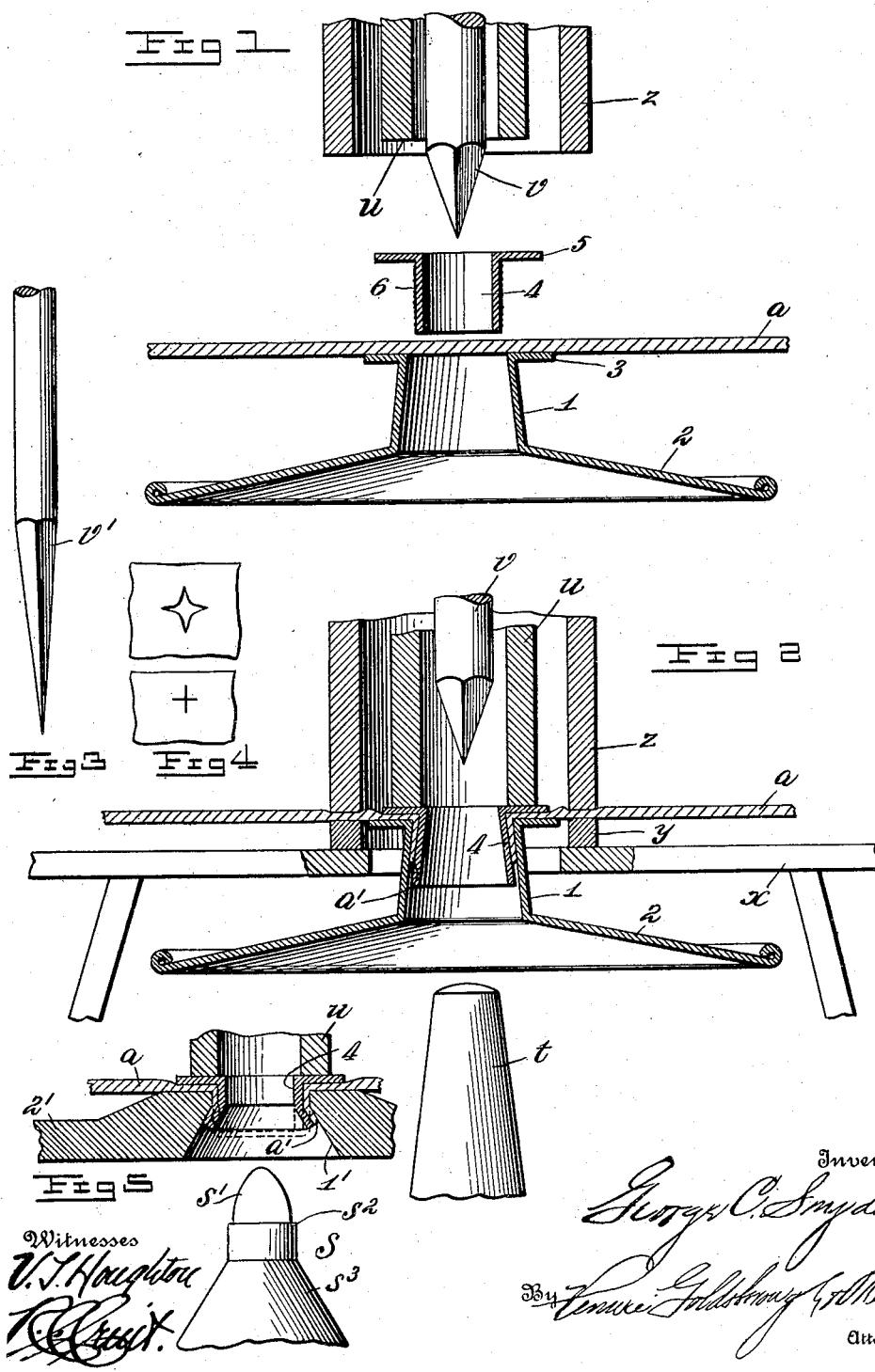

UNITED STATES PATENT OFFICE.

GEORGE C. SNYDER, OF NEW YORK, N. Y.

FASTENING DEVICE.

1,205,046.  Specification of Letters Patent.  Patented Nov. 14, 1916.

Application filed February 10, 1914. Serial No. 817,814.

*To all whom it may concern:*

Be it known that I, GEORGE C. SNYDER, a citizen of the United States, residing in the city of New York, county of New York, and State of New York, have invented certain new and useful Improvements in Fastening Devices; and I do hereby declare the following to be a full, clear, and exact description of the invention, such as will enable others skilled in the art to which it appertains to make and use the same.

This invention relates to fastening devices of the same general type as those disclosed in my pending applications, Ser. No. 793,492, filed Oct. 4, 1913, and Ser. No. 790,236, filed September 17, 1913, but involving the improvements hereinafter set forth.

In the applications above referred to, different forms of fasteners are described, in which the fabric to which the fastener is secured is clamped in an annular space formed by coaxial inner and outer tubular shells.

The present improvement consists more particularly in tapering the opening of the outer member to obtain a better clamping action on the fabric and to maintain the members in assembled relation, as will hereinafter appear.

The invention is illustrated in the accompanying drawing, in which a fastener of the button type has been shown for the purpose of illustrating the invention, but the invention is obviously applicable to fasteners of other types.

In the drawing, Figure 1 is a more or less diagrammatic sectional view illustrating the parts of the improved fastener in position to be assembled. Fig. 2 is a similar view showing the mode of assembling the parts of the fastener. Fig. 3 is a detail view showing a modified form of fabric-perforating needle which may be used when assembling the fastener, and Fig. 4 is a plan view of a portion of the fabric to which the fastener is to be applied showing the character of the perforation made by the type of needle illustrated in Fig. 3. Fig. 5 is a sectional detail view showing a different method of perforating the fabric.

Referring to the drawings, one part of the fastener consists of a tubular shank 1, which may be provided with a head portion 2 constituting a button, but obviously the shank 1 may constitute the outer tubular member of a hollow stud, gromet, or eyelet, in which instance, the head 2 may be dispensed with, and the fastener finished off as desired. The essential feature is that the walls of the shank 1, regardless of what type of fastener the shank is associated with, be tapered, as clearly indicated in the drawings. The shank 1 is preferably provided with a flange 3 to aid in gripping the fabric.

The inner tubular shell or thimble 4 is adapted to be placed in coaxial relation with respect to the shank 1, and is shown in Fig. 1 in position ready to be forced into the hollow shank 1. The thimble 4 is preferably provided with a flange 5 to coöperate with the flange 3 of the shank 1 in gripping the fabric. The walls of the thimble 4, before assemblage, are parallel and the outer face thereof is preferably roughened, as indicated at 6.

The fastener may be sold to the users in two separate parts, as indicated in Fig. 1, and assembled by stretching the fabric or other goods to which the fastener is to be applied over the opening in the shank 1, (Fig. 1). The cylinder "z" of any suitable assembling mechanism may then be lowered to clamp the fabric between the lower edge of the cylinder and a coöperating cylinder y held by any appropriate supporting structure X. The perforating needle v then descends either simultaneously with the anvil cylinder u or immediately therebefore. In either event, the perforation of the fabric by the needle first takes place, after which the anvil cylinder u in descending forces the thimble 4 through the perforation in the fabric a into coaxial relation with the shank 1. The pressure exerted by the anvil cylinder u grips the fabric tightly between the coöperating flanges 3 and 5 of the shank 1 and thimble 4, respectively, as clearly illustrated in Fig. 2. The peripheral edge portion of the fabric is carried into the shank 1 by the insertion of the thimble in said shank, and this action is aided by the roughened surface 6. The portion of the fabric so deflected into the shank 1 is indicated at a', in Fig. 2. At this stage of the operation, however, the fabric is gripped only by the coöperating flanges 3 and 5, since the walls of the tubular shank 1 are inclined, and those of the thimble 4 are parallel. The needle v then rises and a spreading punch t ascends and serves to spread the walls of the thimble into substantial parallelism with the tapered walls of the shank 1. The fabric is then not only gripped between the coöperating flanges 3 and 5, but is also firmly gripped in the annular clamping space formed by the parallel walls of the thimble 4 and shank 1, constituting the coaxial inner and outer shells hereinbefore referred to.

It is desirable not to injure the fiber of the fabric when the same is perforated by the needle, and a perforating needle may be chosen with this end in view. A needle well adapted for the purpose is illustrated in Fig. 3, the operative end of which is provided with knife-edges $v'$ running longitudinally of the needle to produce a perforation in the fabric, such as illustrated in Fig. 4.

From the foregoing it will be seen that the inner tubular shell or thimble 4 having the tapering walls coöperating with the tapering walls of the shank 1, interlocks with the shank 1, and cannot be removed therefrom without first restoring the walls thereof to parallelism. Although it is desirable to extend the end portion $a'$ of the fabric into the annular space between the inner and outer tubular shells to produce an efficient clamping action, it is obvious that the same interlock between the inner and outer shells will exist even if the edge portion $a'$ is not extended into the said annular space.

Any tension applied to the fabric $a$, when gripped by the fastener, as indicated in Fig. 2, will tend to pull or draw the thimble 4 longitudinally from the shank 1. This action, however, only serves to more firmly grip the fabric between the walls of the inner and outer shells, since a longitudinal movement of the inner shell with respect to the outer shell causes the walls of the inner shell to move into closer proximity with those of the outer shell. The roughened outer face of the thimble 4 serves to increase the gripping action, prevents slipping of the fabric and aids in forcing the peripheral edge portion $a'$ of the fabric into the shank 1 when the thimble 4 is forced into place.

Instead of perforating the fabric before the thimble 4 is positioned within the shank 1, the thimble may be positioned first, and then the fabric perforated by means of the tool $s$, shown in Fig. 5. In this figure, a solid button is illustrated having an opening $1'$ which corresponds to the opening in the shank 1 of the other figures. The thimble carries the fabric with it into the opening $1'$, in a positive manner, thereby causing the fabric to be well extended into the annular clamping space between the walls of said opening $1'$ and thimble 4. The said tool $s$ is provided with a centering extremity $s'$, a cutting edge or shoulder $s^2$, and a spreading surface $s^3$. As the tool rises, the extremity $s'$ perforates the fabric and the cutting edge $s^2$ coöperates with the inner edge of the thimble 4, which acts as an outer female die to cut out a disk of the fabric equal in size to the diameter of the thimble. The cutting edge $s^2$ coöperating with the inner edge of the thimble makes a clean cut in the fabric, thereby preventing the existence of a fuzzy peripheral edge at the opening of the fabric. As the tool $s$ further ascends, the spreading surface $s^3$ acts to expand the thimble in the same manner as described with reference to the spreading punch shown in Fig. 2.

Obviously, numerous modifications and changes can be made in the details of construction without departing from the spirit or scope of the invention, as defined in the accompanying claims.

What I claim is:—

1. A fastening device comprising a main body portion having an opening extending completely therethrough with tapering walls, an inner tubular thimble adapted to be placed in coaxial relation with said opening and to carry with it a portion of the fabric to which the fastening device is to be secured, the walls of said thimble being adapted to be spread radially to clamp the fabric against the tapered walls of said opening.

2. A fastening device comprising inner and outer telescopic members, said outer member having an opening extending completely therethrough with tapering walls and said inner member comprising a tubular thimble adapted to be placed in coaxial relation with said opening and to carry with it a portion of the fabric to which the device is to be secured, said thimble having walls adapted to be spread into parallelism with the tapered walls of said opening to clamp the fabric in an annular clamping space between the tapered walls of said opening and the walls of the thimble.

In testimony whereof I affix my signature, in presence of two witnesses.

GEORGE C. SNYDER.

Witnesses:
E. J. FERREE,
WM. HENRY.

Copies of this patent may be obtained for five cents each, by addressing the "Commissioner of Patents, Washington, D. C."